(12) United States Patent
Morita et al.

(10) Patent No.: US 11,588,364 B2
(45) Date of Patent: Feb. 21, 2023

(54) MOTOR COIL SUBSTRATE AND MOTOR

(71) Applicant: IBIDEN CO., LTD., Ogaki (JP)

(72) Inventors: Haruhiko Morita, Ogaki (JP); Hitoshi Miwa, Ogaki (JP); Shinobu Kato, Ogaki (JP); Toshihiko Yokomaku, Ibi-gun (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 188 days.

(21) Appl. No.: 17/004,180

(22) Filed: Aug. 27, 2020

(65) Prior Publication Data
US 2021/0066982 A1    Mar. 4, 2021

(30) Foreign Application Priority Data
Aug. 30, 2019   (JP) .............................. JP2019-158234

(51) Int. Cl.
*H02K 3/28* (2006.01)
*H02K 3/26* (2006.01)

(52) U.S. Cl.
CPC ................. *H02K 3/26* (2013.01); *H02K 3/28* (2013.01); *H02K 2203/03* (2013.01); *H02K 2213/03* (2013.01)

(58) Field of Classification Search
CPC .. H02K 3/00; H02K 3/26; H02K 3/28; H02K 3/47
See application file for complete search history.

(56) References Cited

FOREIGN PATENT DOCUMENTS

| CN | 102403087 | * | 2/2012 | ............... H02K 3/26 |
| EP | 2056309 | * | 5/2009 | ............... H02K 3/26 |
| JP | 2007-124892 A | | 5/2007 | |

* cited by examiner

*Primary Examiner* — Tran N Nguyen
(74) *Attorney, Agent, or Firm* — Oblon, McClelland, Maier & Neustadt, L.L.P.

(57) ABSTRACT

A motor coil substrate includes a coil substrate that is wound in a cylindrical shape and includes a flexible substrate and coils formed on the flexible substrate such that the flexible substrate has a first end and a second end on an opposite side with respect to the first end and that the coils are arrayed from the first end to the second end of the flexible substrate. The coils are formed such that each of the coils has a central space and includes wirings surrounding the central space, and the flexible substrate has openings formed such that each of the openings is penetrating through the flexible substrate and positioned in the central space of a respective one of the coils.

20 Claims, 7 Drawing Sheets

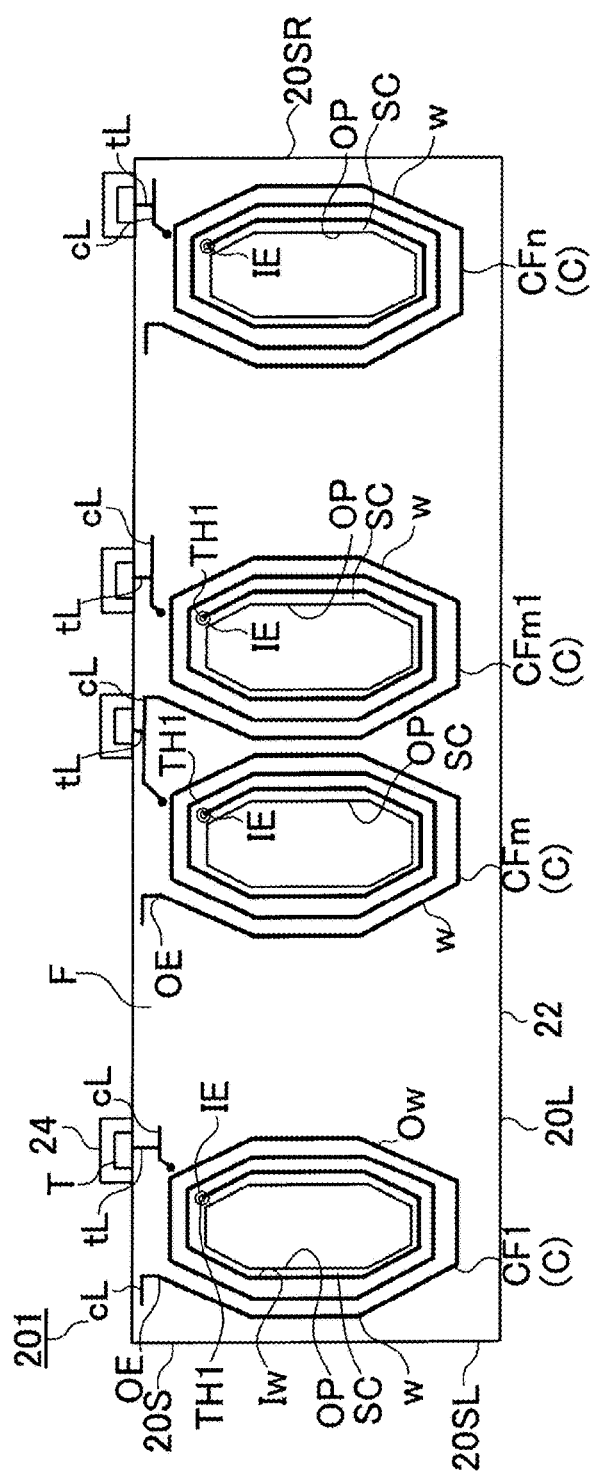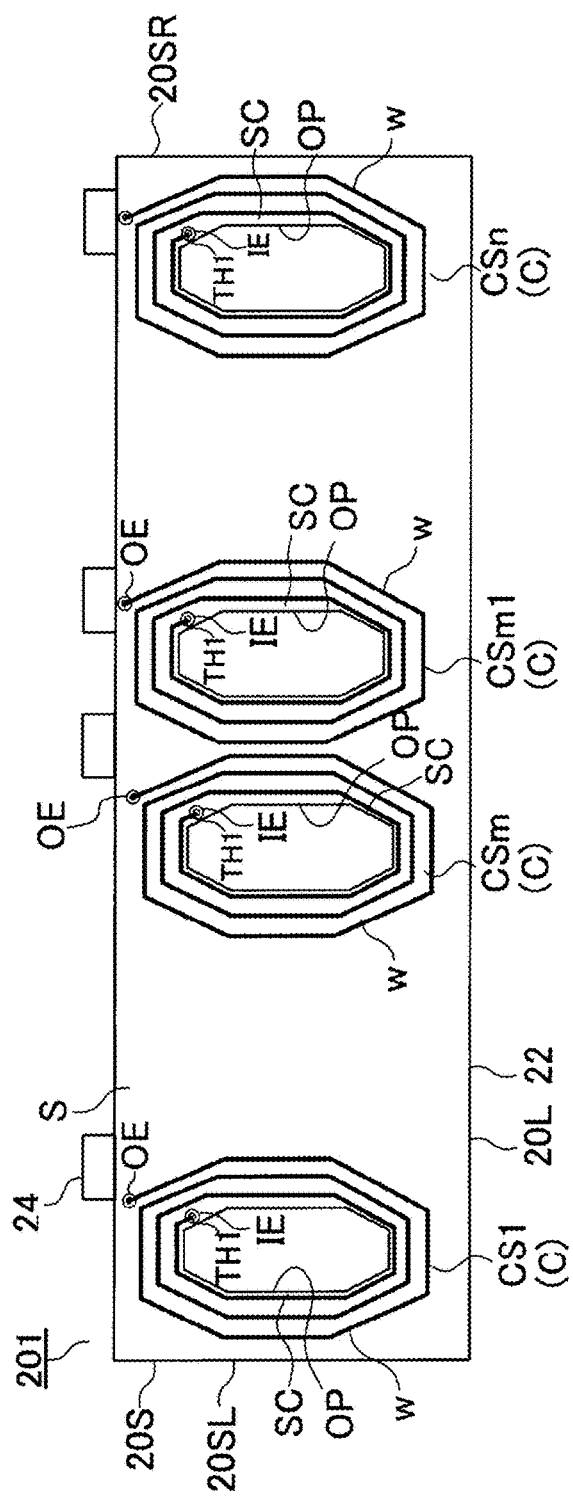

MOTOR COIL SUBSTRATE AND MOTOR

CROSS-REFERENCE TO RELATED APPLICATIONS

The present application is based upon and claims the benefit of priority to Japanese Patent Application No. 2019-158234, filed Aug. 30, 2019, the entire contents of which are incorporated herein by reference.

BACKGROUND OF THE INVENTION

Field of the Invention

The present invention relates to a motor coil substrate and a motor.

Description of Background Art

Japanese Patent Application Laid-Open Publication No. 2007-124892 relates to an electric motor, which includes multiple single coils formed of wires. The entire contents of this publication are incorporated herein by reference.

SUMMARY OF THE INVENTION

According to one aspect of the present invention, a motor coil substrate includes a coil substrate that is wound in a cylindrical shape and includes a flexible substrate and coils formed on the flexible substrate such that the flexible substrate has a first end and a second end on an opposite side with respect to the first end and that the coils are arrayed from the first end to the second end of the flexible substrate. The coils are formed such that each of the coils has a central space and includes wirings surrounding the central space, and the flexible substrate has openings formed such that each of the openings is penetrating through the flexible substrate and positioned in the central space of a respective one of the coils.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A illustrates upper coils of a coil substrate of the first embodiment;

FIG. 2B illustrates lower coils of the coil substrate;

DETAILED DESCRIPTION OF THE EMBODIMENTS

Figure 1A:
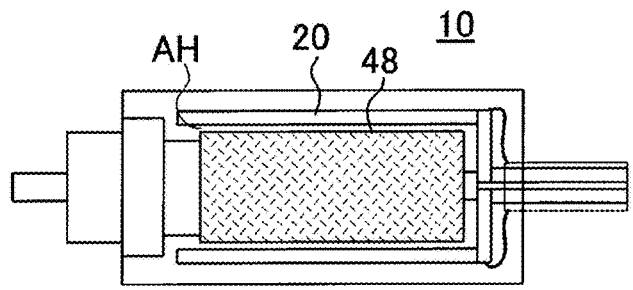
FIG. 1A is a schematic diagram of a motor.

Embodiments will now be described with reference to the accompanying drawings, wherein like reference numerals designate corresponding or identical elements throughout the various drawings.

First Embodiment

A coil substrate 201 illustrated in FIGS. 2A and 2B is prepared. The coil substrate 201 is formed of a flexible substrate 22, which has a first surface (F) and a second surface (S) on an opposite side with respect to the first surface (F), and coils (C) on the flexible substrate 22. By winding the coil substrate 201 in a tubular shape, a motor coil substrate 20 illustrated in FIG. 1B is obtained. The motor coil substrate 20 is wound around a hollow space (AH). For example, the motor coil substrate 20 has a cylindrical shape. The number of windings is 2 or more and 5 or less. FIG. 1B is a schematic diagram.

Figure 1B:
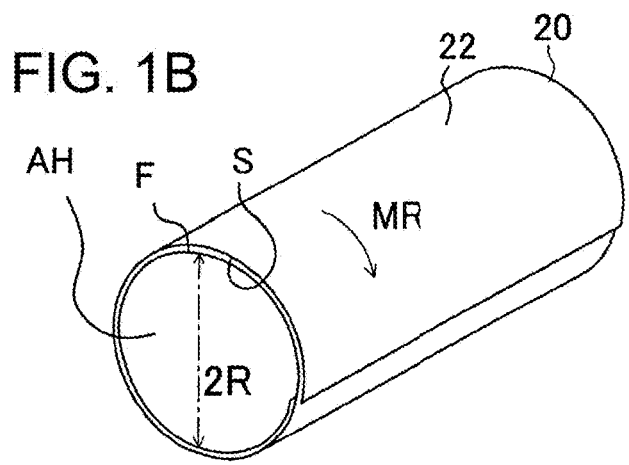
FIGS. 1B and 1D are schematic diagrams of a motor coil substrate of a first embodiment.

As illustrated in FIG. 1A, a motor 10 is obtained by positioning a magnet 48 inside the motor coil substrate 20. FIG. 1A is a schematic diagram. The motor coil substrate 20 is positioned around the magnet 48 via a hollow space (AH). An example of the motor 10 is a DC motor. The motor 10 can further have a commutator, a brush and a housing (which are not illustrated in the drawings). In a first embodiment, the motor coil substrate 20 rotates. However, it is also possible that the magnet 48 rotates.

Figure 1C:
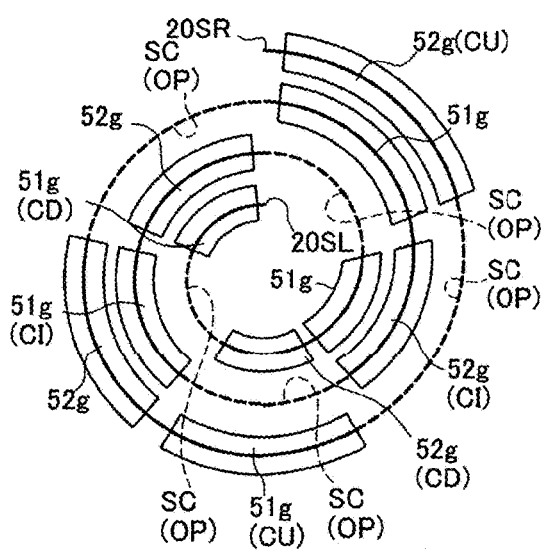
FIG. 1C illustrates a cross section of the motor coil substrate.
Figure 1D:
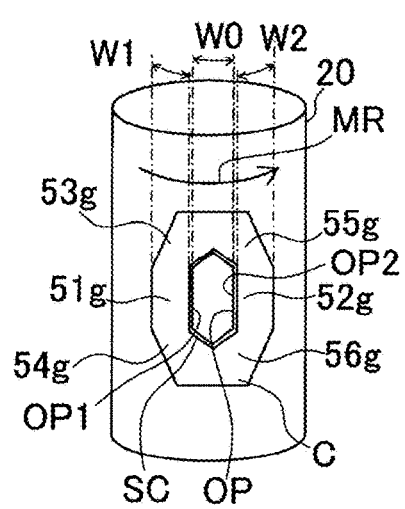

A rotation direction (MR) of the motor 10 is illustrated in FIGS. 1B and 1D. When the motor coil substrate 20 is cut in a plane parallel to the rotation direction (MR), a cross-sectional shape of the motor coil substrate 20 is substantially a circle. A radius of the circle is R (radius (R)).

When the magnet 48 is positioned in the motor coil substrate 20 such that the first surface (F) of the flexible substrate 22 and the magnet 48 face each other, the radius (R) is a distance between a center of the circle and the first surface (F). When the second surface (S) and magnet 48 face each other, the radius (R) is a distance between the center of the circle and the second surface (S).

In the example of FIG. 1B, the number of windings is 2 or more. In this case, the radius (R) is a distance between the center and a surface facing the hollow space (AH).

FIGS. 2A and 2B illustrate the coil substrate 201 for forming the motor coil substrate 20 of the first embodiment. The coil substrate 201 is formed of the flexible substrate 22, which has the first surface (F) and the second surface (S) on an opposite side with respect to the first surface (F), and the multiple coils (C) formed on the flexible substrate 22. A coil (C) formed on the first surface (F) of the flexible substrate 22 is referred to as an upper coil (CF). A coil (C) formed on the second surface (S) of the flexible substrate 22 is referred to as a lower coil (CS).

As illustrated in FIG. 2A, the flexible substrate 22 preferably has short sides (20S) and long sides (20L). The upper coils (CF) are arrayed along the long sides (20L) of the flexible substrate 22. The upper coils (CF) are arrayed in one row from a one-end (20SL) to an other-end (20SR) of the flexible substrate 22. The number of the upper coils (CF) is N (number (N)).

In FIG. 2A, a 1st upper coil (CF1), an m-th upper coil (CFm), an (m+1)-th upper coil (CFm1) and an N-th upper coil (CFn) are drawn.

As illustrated in FIG. 2B, the lower coils (CS) are arrayed along the long sides (20L) of the flexible substrate 22. The lower coils (CS) are arrayed in one row from the one-end (20SL) to the other-end (20SR) of the flexible substrate 22. The number of the lower coils (CS) is N (number (N)).

In FIG. 2B, a 1st lower coil (CS1), an m-th lower coil (CSm), an (m+1)-th lower coil (CSm1), and an N-th lower coil (CSn) are drawn.

N is desirably 3 or more and 11 or less. m and N are natural numbers.

As illustrated in FIGS. 2A and 2B, the m-th lower coil (CSm) is formed directly below the m-th upper coil (CFm). The m-th upper coil (CFm) and the m-th lower coil (CSm) are substantially symmetrically formed via the flexible substrate 22. The m-th upper coil (CFm) and the m-th lower coil (CSm) are connected to each other by a through-hole conductor (TH1) penetrating the flexible substrate 22.

In the coil substrate 201 of the first embodiment, a winding direction of each of the upper coils (CF) and a direction of a current flowing through each of the upper coils (CF) are the same. A winding direction of each of the lower coils (CS) and a direction of a current flowing through each of the lower coils (CS) are the same. The winding direction of the m-th upper coil (CF) and the winding direction of the m-th lower coil (CS) are the same. The direction of the current flowing through the m-th upper coil (CF) and the direction of the current flowing through the m-th lower coil (CS) are the same. In FIGS. 2A and 2B, the winding directions and the directions of the currents are counter-clockwise. The winding directions of the coils (C) in the coil substrate 201 are observed from a position above the first surface (F). The directions of the currents flowing through the coils (C) in the coil substrate 201 are observed from a position above the first surface (F).

The multiple coils (C) formed on the flexible substrate 22 are simultaneously formed. For example, the multiple coils (C) are formed on the flexible substrate 22 using an alignment mark. Therefore, positions of the coils (C) are related to each other.

The upper coils (CF) are connected to each other via connection wirings (cL) and the lower coils (CS). The m-th upper coil (CFm) is connected to the (m+1)-th upper coil (CFm1) via a connection wiring (cL) and the m-th lower coil (CSm). And, the N-th upper coil (CFn) is connected to the 1st upper coil (CF1) via a connection wiring (cL) and the N-th lower coil (CSn). In this way, the upper coils (CF) are sequentially connected by the connection wirings (cL).

The lower coils (CS are connected to each other via connection wirings (cL) and the upper coils (CF). The m-th lower coil (CSm) is connected to the (m+1)-th lower coil (CSm1) via a connection wiring (cL) and the (m+1)-th upper coil (CFm1). And, the N-th lower coil (CSn) is connected to the 1st lower coil (CS1) via a connection wiring (cL) and the 1st upper coil (CF1). In this way, the lower coils (CS) are sequentially connected by the connection wirings (cL).

In FIGS. 2A and 2B, the connection wirings (cL) are partially drawn. The connection wirings (cL) are each formed of at least one of a through-hole conductor penetrating the flexible substrate 22, a conductor circuit on the first surface (F), and a conductor circuit on the second surface (S).

As illustrated in FIGS. 2A and 2B, the coil substrate 201 of the first embodiment can have terminal substrates 24 and terminals (T) formed on the terminal substrates 24. The terminal substrates 24 and the flexible substrate 22 that supports the coils (C) are formed of a single-piece flexible substrate 22.

The coil substrate 201 can include multiple terminal wirings (tL) that connect the connection wirings (cL) to the terminals (T). The terminal wirings (tL) include a wiring (tL) extending from the connection wiring (cL) connecting the m-th upper coil (CFm) and the (m+1)-th upper coil (CFm1), and a wiring (tL) extending from the connection wiring (cL) connecting the N-th upper coil (CFn) and the 1st upper coil (CF1).

The terminals (T) and the coils (C) are simultaneously formed. The number of the terminal substrates 24 is preferably the same as the number of the upper coils (CF). The number of the terminals (T) is preferably the same as the number of the upper coils (CF).

The single coils of Patent Document 1 are each formed of a wire. In contrast, the coils (C) of the first embodiment are formed using a technology for a printed wiring board. Wirings (w) forming the coils (C) are formed by plating. Or, the wirings (w) forming the coils (C) are formed by etching a copper foil. The wirings (w) forming the coils (C) are formed using a semi-additive method, an M-Sap method, or a subtractive method.

The wirings (w) forming the coils (C) are formed using a technology for a printed wiring board. Therefore, a cross-sectional shape of each of the wirings (w) is substantially rectangular. Since a cross section of a wire is a circle, according to the first embodiment, a space factor of the coils can be increased.

Figure 3A:
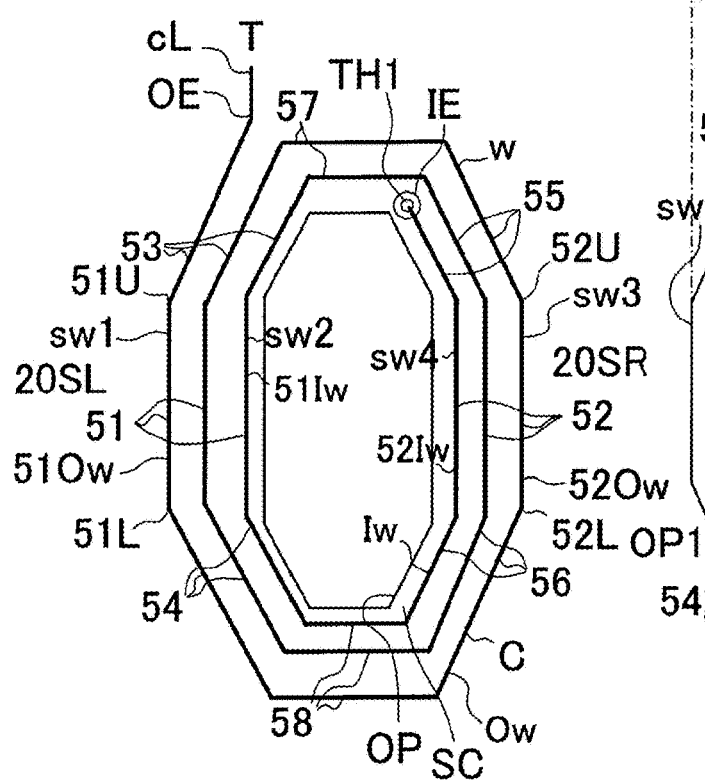
FIG. 3A illustrates a wiring of an upper coil of the first embodiment.

An example of a coil (C) is illustrated in FIG. 3A. The coils (C) are each formed by a central space (SC) and wirings (w) surrounding the central space (SC). An opening (OP) of the flexible substrate 22 is formed in the central space (SC). The wirings (w) have an outer end (OE) and an inner end (IE). The wirings (w) are formed between the outer end (OE) and the inner end (IE). The wirings (w) forming a coil (C) are formed in a spiral shape. Among the multiple wirings (w), an innermost wiring (w) is an inner side wiring (Iw). An inner side of the inner side wiring (Iw) is the central space (SC). An outermost wiring (w) is an outer side wiring (Ow).

As illustrated in FIG. 3A, the wirings (w) include multiple first wirings 51 and multiple second wirings 52, the first wirings 51 facing the second wirings 52 across the central space. In one coil (C), the first wirings 51 are close the one-end (20SL), and the second wirings 52 are close to the other-end (SR). The first wirings 51 are formed substantially parallel to each other. The second wirings 52 are formed substantially parallel to each other. The first wirings 51 and the second wirings 52 are formed substantially parallel to each other. When the motor 10 of the first embodiment is manufactured, the magnet 48 is positioned in the motor coil substrate 20 such that an angle between the first wirings 51 and the rotation direction of the motor is substantially 90 degrees.

The first wirings 51 each have an upper end (51U) and a lower end (51L) on an opposite side with respect to the upper end (51U). The second wirings 52 each have an upper end (52U) and a lower end (52L) on an opposite side with respect to the upper end (52U). The upper ends (51U, 52U) are close to the terminal (T), and the lower ends (51L, 52L) are far from the terminal (T).

The wirings (w) include multiple third wirings 53 that respectively extend from the upper ends (51U) of the first wirings 51.

The wirings (w) include multiple fourth wirings 54 that respectively extend from the lower ends (51L) of the first wirings 51.

The wirings (w) include multiple fifth wirings 55 that respectively extend from the upper ends (52U) of the second wirings 52.

The wirings (w) include multiple sixth wirings 56 that respectively extend from the lower ends (52L) of the second wirings 52.

The wirings (w) include multiple seventh wirings 57 that respectively connect the third wirings 53 to the fifth wirings 55.

The wirings (w) include multiple eight wirings 58 that respectively connect the fourth wirings 54 to the sixth wirings 56.

Among the multiple first wirings 51, an outermost first wiring 51 is an outer side first wiring (51Ow).

Among the multiple first wirings 51, an innermost first wiring 51 is an inner side first wiring (51Iw). The inner side first wiring (51Iw) faces the central space (SC).

Among the multiple second wirings 52, an outermost second wiring 52 is an outer side second wiring (52Ow).

Among the multiple second wirings 52, an innermost second wiring 52 is an inner side second wiring (52Iw). The inner side second wiring (52Iw) faces the central space (SC).

Figure 1E:
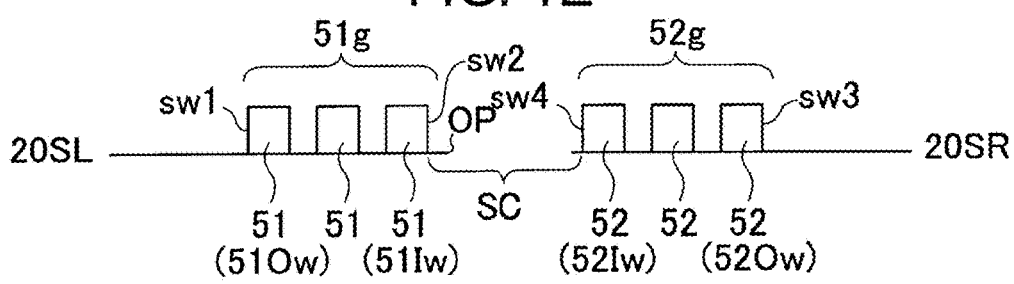
FIG. 1E illustrates cross sections of first wirings and second wirings.

FIG. 1E illustrates cross sections of the wirings (w) and side walls of the wirings (w). FIG. 1E illustrates the first wirings 51 and the second wirings 52. The outer side first wiring (51Ow) has a first side wall (sw1) facing the one-end (20SL). The inner side first wiring (51Iw) has a second side wall (sw2) facing the central space (SC).

The outer side second wiring (52Ow) has a third side wall (sw3) facing the other-end (20SR). The inner side second wiring (52Iw) has a fourth side wall (sw4) facing the central space (SC).

Figure 3B:
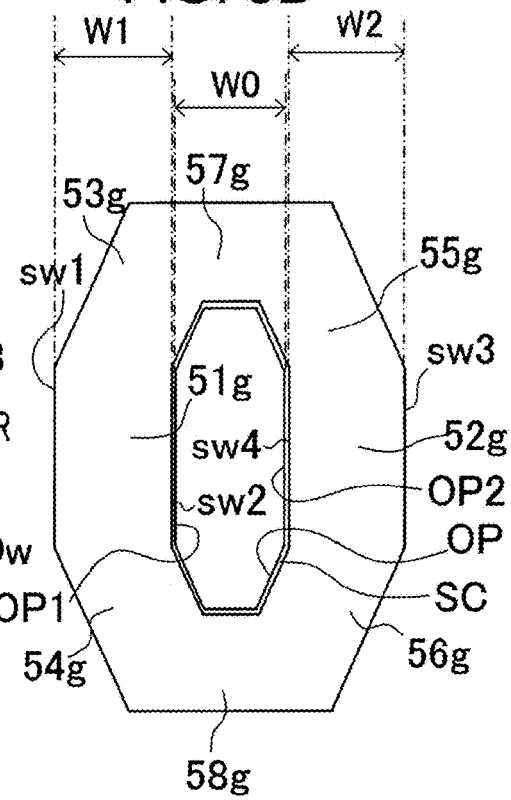
FIG. 3B is a schematic diagram of an upper coil formed by wiring groups.

FIG. 3B illustrates a simplified coil (C). In FIG. 3B, the wirings (w) of the coil (C) illustrated in FIG. 3A are grouped. The multiple first wirings 51 form a first wiring group (51g). The multiple second wirings 52 form a second wiring group (52g). The multiple third wirings 53 form a third wiring group (53g). The multiple fourth wirings 54 form a fourth wiring group (54g). The multiple fifth wirings 55 form a fifth wiring group (55g). The multiple sixth wirings 56 form a sixth wiring group (56g). The multiple seventh wirings 57 form a seventh wiring group (57g). The multiple eighth wirings 58 form an eighth wiring group (58g).

A schematic diagram of the motor coil substrate 20 having the coils (C) drawn in wiring groups is illustrated in FIG. 1D.

The coils (C) each have a distance (W1), a distance (W2) and a distance (W0) illustrated in FIG. 3B.

The distance (W1) is a distance between the first side wall (sw1) of the outer side first wiring (51Ow) forming the m-th coil and the second side wall (sw2) of the inner side first wiring (51Iw) forming the m-th coil. The distance (W1) is a width of the first wiring group (51g) and is measured along the rotation direction (MR).

The distance (W2) is a distance between the third side wall (sw3) of the outer side second wiring (52Ow) forming the m-th coil and the fourth side wall (sw4) of the inner side second wiring (52Iw) forming the m-th coil. The distance (W2) is a width of the second wiring group (52g) and is measured along the rotation direction (MR).

The distance (W0) is a distance between an edge (OP1) on the first wiring group (51g) side and an edge (OP2) on the second wiring group (52g) side of the opening (OP). The distance (W0) is a width of the opening (OP) and is measured along the rotation direction (MR).

The distance (W1), the distance (W2) and the distance (W0) are measured along a straight line perpendicular to the first wirings 51.

In the motor coil substrate 20 of the first embodiment, by winding the coil substrate 20, the first wiring groups (51g) and the second wiring groups (52g) perpendicular to the rotation direction (MR) can be positioned on the openings (OP) of the central spaces (SC). Such a state is schematically illustrated in FIG. 1C. FIG. 1C illustrates a cross section of the motor coil substrate 20. The first wiring groups (51g) and the second wiring groups (52g) perpendicular to the rotation direction (MR) are substantially uniformly positioned. Most of the magnet 48 is surrounded by the first wiring groups (51g) and the second wiring groups (52g) perpendicular to the rotation direction (MR). An area where the first wiring groups (51g) and the second wiring groups (52g) are not present can be reduced. When the first wiring groups (51g) and the second wiring groups (52g) overlap, a thickness of the motor coil substrate 20 is partially increased. However, by positioning the first wiring groups (51g) and the second wiring groups (52g) perpendicular to the rotation direction (MR) on the openings (OP) of the central spaces (SC), that the thickness is partially increased can be suppressed. A motor 10 having high efficiency can be provided.

Further, it is desirable that the distance (W1) and the distance (W2) be substantially equal to each other. Even when the coil substrate 20 is wound, a first wiring group (51g) or a second wiring group (52g) perpendicular to the rotation direction (MR) is unlikely to be positioned on a first wiring group (51g) or a second wiring group (52g) perpendicular to the rotation direction (MR). That the thickness of the motor coil substrate 20 is partially increased can be avoided. The magnet 48 is substantially completely surrounded by the first wiring groups (51g) and the second wiring groups (52g) perpendicular to the rotation direction (MR). A motor 10 having high efficiency can be provided.

As schematically illustrated in FIG. 1C, the coils can be classified into upper layer coils (CU) of an outermost layer (exposed surface), inner layer coils (CI) positioned on a one-layer inner side of the upper coils (CU), and lower layer coils (CD) positioned on an inner side of the inner layer coils (CI).

The m-th coils (C) (the m-th upper coil (CFm) and the m-th lower coil (CSm)) are positioned as inner layer coils (CI).

Figure 3C:
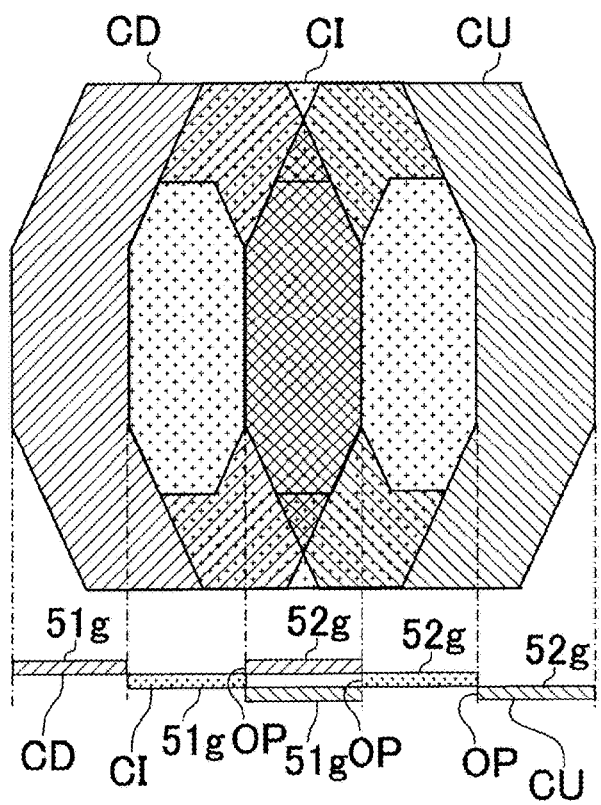
FIG. 3C is a schematic diagram illustrating overlapping of central spaces and wiring groups.

FIG. 3C is a schematic diagram illustrating overlapping between an inner layer coil (CI), an upper layer coil (CU) that partially overlaps the inner layer coil (CI), and a lower layer coil (CD) that partially overlaps the inner layer coil (CI).

The second wiring group (52g) of the lower layer coil (CD) and the first wiring group (51g) of the upper layer coil (CU) overlap in the opening (OP) of the central space (SC) of the inner layer coil (CI).

In the motor coil substrate 20 of the first embodiment, as illustrated in FIG. 1C, the opening (OP) of the lower layer coil (CD) is positioned at a place where the second wiring group (52g) of the upper layer coil (CU) and the first wiring group (51g) of the inner layer coil (CI) overlap.

Further, the opening (OP) of the upper layer coil (CU) is positioned at a place where the second wiring group (52g) of the inner layer coil (CI) and the first wiring group (51g) of the lower layer coil (CD) overlap.

It is desirable that the distance (W1) and the distance (W2) be shorter than the distance (W0). When the distance (W1) and the distance (W2) are shorter than the distance (W0), the first wiring group (51g) of the upper layer coil (CU) and the second wiring group (52g) of the lower layer coil (CD) overlap in the opening (OP) of the inner layer coil (CI). The second wiring group (52g) of the upper layer coil (CU) and the first wiring group (51g) of the inner layer coil (CI) overlap in the opening (OP) of the lower layer coil (CD). Further, the second wiring group (52g) of the inner layer coil (CI) and the first wiring group (51g) of the lower layer coil (CD) overlap in the opening (OP) of the upper layer coil (CU). Therefore, in the motor coil substrate 20 of the first embodiment, a locally thick portion does not occur.

In the motor coil substrate 20 of the first embodiment, the first wiring group (51g) of the upper layer coil (CU) and the second wiring group (52g) of the lower layer coil (CD) overlap in the central space (SC) of the inner layer coil (CI). Therefore, although the wirings of the upper layer coil (CU) and the lower layer coil (CD) overlap in the central space (SC) (the flexible substrate is doubly overlapped), since the overlapping occurs in the opening (OP) of the flexible substrate provided in the central space (SC), the flexible substrate does not become triply overlapped. The thickness of the motor coil substrate 20 can be uniformized and the space factor of the coils can be increased.

Second Embodiment

Figure 4A:
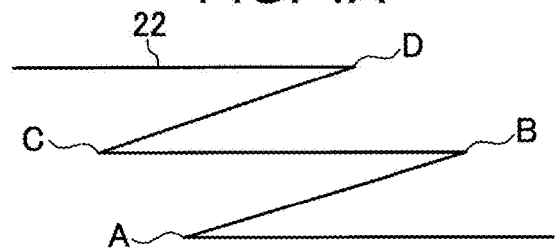
FIGS. 4A and 4B illustrate a cross section of a laminated coil substrate according to a second embodiment.
Figure 4B:
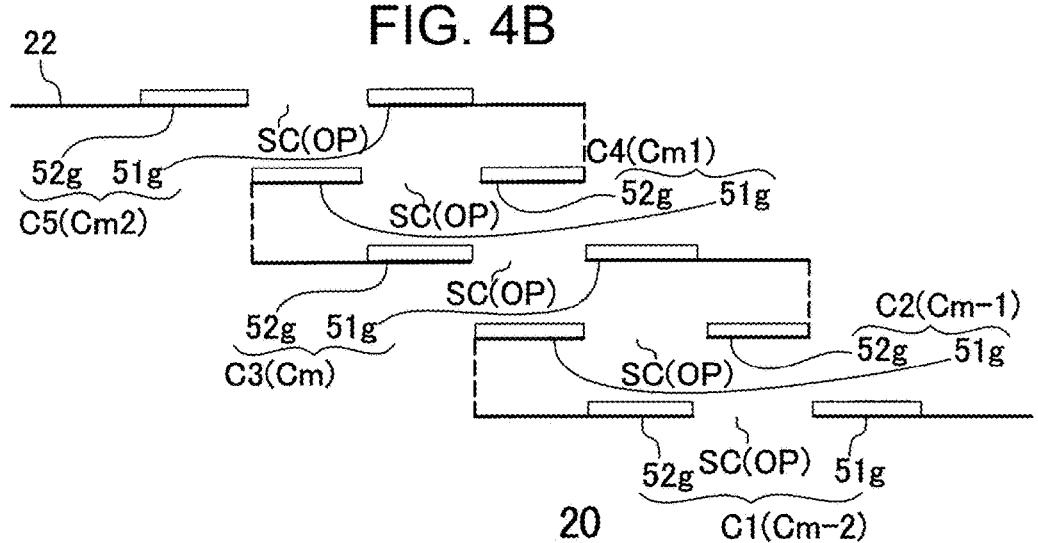
Figure 4C:
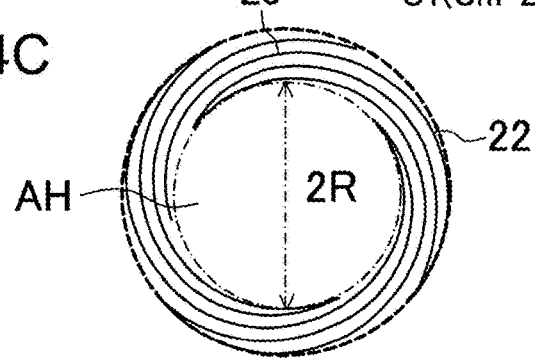
FIG. 4C illustrates a cross section of a motor coil substrate of the second embodiment.
Figure 4D:
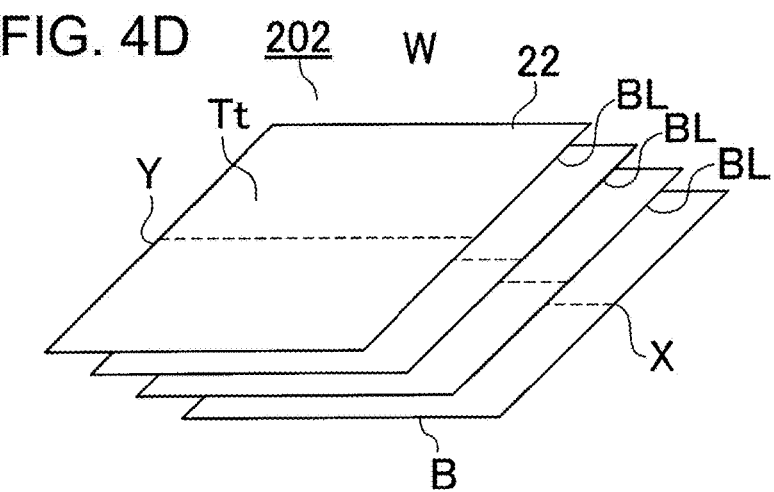
FIG. 4D illustrates the laminated coil substrate of the second embodiment.

FIG. 4C illustrates a cross section of a motor coil substrate 20 of a second embodiment. FIG. 4C schematically illustrates a flexible substrate 22 forming the motor coil substrate 20. FIG. 4D illustrates a folded flexible substrate 22. In the second embodiment, the flexible substrate 22 is folded. After that, the folded flexible substrate 22 is wound. Then, the wound flexible substrate 22 is positioned around a magnet. For example, the number of windings of the folded flexible substrate 22 is 1 or more and 2 or less.

Figure 5:
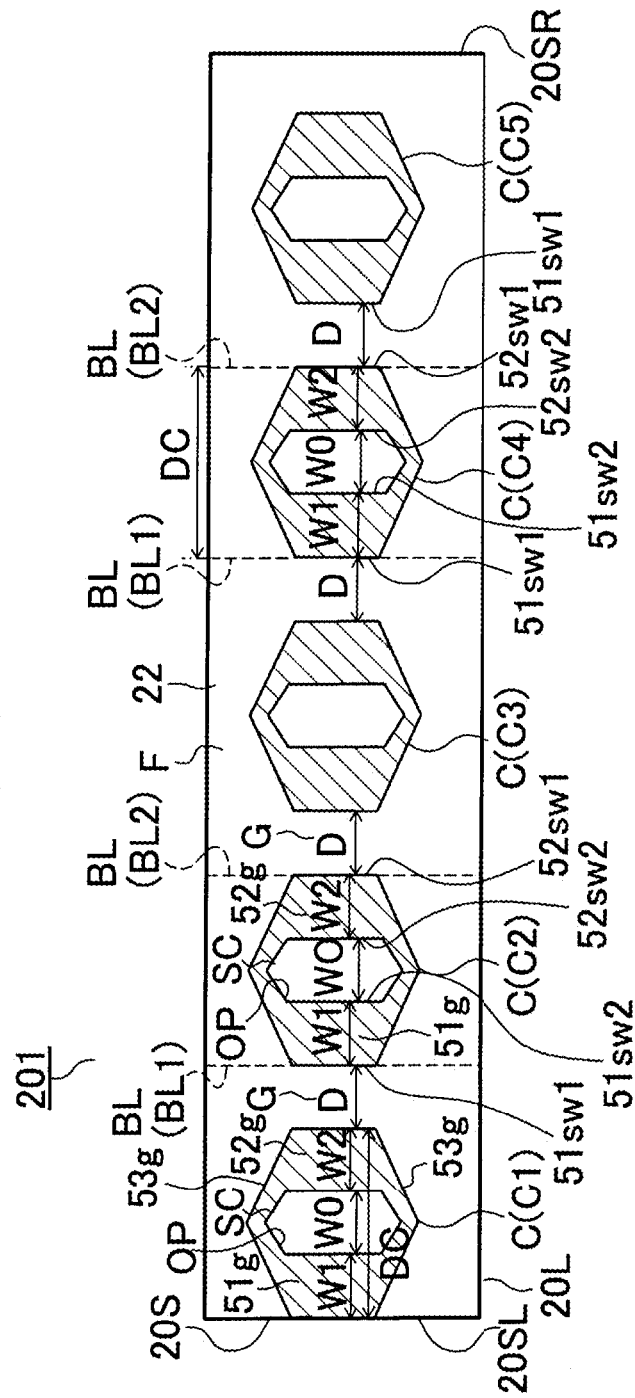
FIG. 5 illustrates a coil substrate of the second embodiment.

FIG. 5 illustrates a coil substrate 201 for forming the motor coil substrate 20 of the second embodiment. The coil substrate 201 is formed of the flexible substrate 22, which has a first surface (F) and a second surface (S) on an opposite side with respect to the first surface (F), multiple coils (C) formed on the first surface (F) of the flexible substrate 22, and gaps (G) that exists between adjacent coils (C). In FIG. 5, the coils (C) are simplified.

As illustrated in FIG. 5, the flexible substrate 22 preferably has short sides (20S) and long sides (20L). The coils (C) are arrayed along the long sides (20L) of the flexible substrate 22. The coils (C) are arrayed in one row from a one-end (20SL) to an other-end (20SR) of the flexible substrate 22. The number of the coils (C) is N.

The coils (C) each have a number. The number of each of the coils (C) increases in order from the one-end (20SL) to the other-end (20SR). The number of the coil (C1) closest to the one-end (20SL) is 1. The number of the coil (Cn) closest to the other-end (20SR) is N.

The coil substrate 201 illustrated in FIG. 5 has five coils (C). The coil (C) closest to the one-end (20SL) is the 1st coil (C1) (the coil with the number of 1). The coil (C) next to the 1st coil (C1) is the 2nd coil (C2) (the coil with the number of 2). The coil (C) next to the 2nd coil (C2) is the 3rd coil (C3) (the coil with the number of 3). The coil (C) next to the 3rd coil (C3) is the 4th coil (C4) (the coil with the number of 4). The coil (C) next to the 4th coil (C4) is the 5th coil (C5) (the coil with the number of 5). The 5th coil (C5) is closest to the other-end (20SR).

As illustrated in FIG. 5, the coils (C) are each formed by a central space (SC) and wiring groups surrounding the central space (SC). The wiring groups include a first wiring group (51g) and a second wiring group (52g), which are perpendicular to the rotation direction (MR) (see FIG. 1B), and a third wiring group (53g) connecting the first wiring group (51g) and the second wiring group (52g) to each other. An opening (OP) is formed along each of the central spaces (SC).

In FIG. 5, wirings are grouped. The first wiring group (51g) is formed of multiple first wirings. The second wiring group (52g) is formed of multiple second wirings. The third wiring group (53g) is formed of multiple third wirings. A gap (G) is formed between the second wiring group (52g) of the m-th coil (Cm) and the first wiring group (51g) of the (m+1)-th coil (Cm1). The first wiring group (51g) has a distance (W1). The second wiring group (52g) has a distance (W2). The opening (OP) of the central space (SC) has a distance (W0). A distance of the central space (SC) is substantially equal to the distance of the opening (OP). The coils (C) each have a distance (DC). The gaps (G) each have a distance (D). The distance (W1), the distance (W2), the distance (W0) and the distance (D) are substantially equal to each other. The distance (W1), the distance (W2), the distance (W0), the distance (D) and the distance (DC) are each measured along a straight line perpendicular to the first wirings forming the first wiring group (51g).

The flexible substrate 22 is folded along folding lines (BL). The coil substrate 201 is folded along the folding lines (BL). The folding lines (BL) include folding lines (first folding lines) (BL1) provided in the coils (C) via the gaps (G), and folding lines (second folding lines) (BL2) formed alone the second wiring groups (52g) of the coils (C).

First, the flexible substrate 22 is folded so that the first surface (F) and the first surface (F) face each other. Subsequently, the flexible substrate 22 is folded such that the second surface (S) and the second surface (S) face each other. Then, the flexible substrate 22 is folded such that the first surface (F) and the first surface (F) face each other. In this way, the flexible substrate 22 is folded such that the first surfaces (F) and the second surfaces (S) alternately face each other. The laminated coil substrate 202 illustrated in FIG. 4D is obtained.

As illustrated in FIG. 4D, the laminated coil substrate 202 has a bottom surface (B) and a top surface (Tt) on an opposite side with respect to the bottom surface (B). The bottom surface (B) is a lowermost surface of the laminated coil substrate 202, and the top surface (Tt) is an uppermost surface of the laminated coil substrate 202. As illustrated in FIG. 4D, the flexible substrate 22 is folded such that a stairway is formed in one direction from the bottom surface (B) to the top surface (Tt).

FIGS. 4A and 4B illustrate overlapping of the coils (C) and a cross section of the laminated coil substrate 202. FIGS.

4A and 4B illustrate a cross section of the laminated coil substrate 202 positioned between X and Y illustrated in FIG. 4D. In FIGS. 4A and 4B, the flexible substrate 22 is drawn with solid lines. For example, the laminated coil substrate 202 illustrated in FIGS. 4A and 4B is formed by folding the coil substrate 201 of FIG. 5. FIG. 4A illustrates only the flexible substrate 22. FIG. 4B illustrates the flexible substrate 22 and the wirings of the coils (C). The flexible substrate 22 in FIG. 4B is divided in order to illustrate the overlapping of the coils (C). The dotted lines in FIG. 4B illustrate portions that are divided, and in the actual laminated coil substrate 202, the solid lines are continuous. The flexible substrate 22 is not cut in the middle. The dotted lines in FIG. 4B respectively correspond to the positions at which the flexible substrate 22 is folded. That is, the dotted lines in FIG. 4B respectively correspond to positions (A, B, C, D) in FIG. 4A. The wirings illustrated in FIG. 4B are the first wirings and the second wirings, and an angle between the wirings and the rotation direction (MR) of the motor 10 is approximately 90 degrees. The first wirings and the second wirings are grouped. Cross sections of the first wiring groups (51g) and the second wiring groups (52g) are drawn in FIG. 4B.

As illustrated in FIG. 4B, in the laminated coil substrate 202 of the second embodiment, the first wiring group (51g) of the (m−1)-th coil ($C_{m-1}$) and the second wiring group (52g) of (m+1)-th coil (Cm1) overlap in the opening (OP) of the central space (SC) of the m-th coil (Cm).

The second wiring group (52g) of the (m−2)-th coil ($C_{m-2}$) and the first wiring group (51g) of the m-th coil (Cm) overlap in the opening (OP) of the central space (SC) of the (m−1)-th coil ($C_{m-1}$).

The second wiring group (52g) of m-th coil (Cm) and the first wiring group (51g) of (m+2)-th coil (Cm2) overlap in the opening (OP) of the central space (SC) of the (m+1)-th coil (Cm1). It is desirable that the distance (W1) and the distance (W2) be shorter than the distance (W0). When the distance (W1) and the distance (W2) are shorter than the distance (W0), in the central space (SC) of one coil (C), the first wiring group (51g) or the second wiring group (52g) of the coil on a front side of the one coil and the second wiring group (52g) or the first wiring group (51g) of the coil on a rear side of the one coil overlap. Therefore, in the motor coil substrate 20 of the second embodiment, a locally thick portion does not occur.

In the motor coil substrate 20 of the second embodiment, in the central space (SC) of one coil (C), the second wiring group (52g) or the first wiring group (51g) of the coil on a front side of the one coil and the first wiring group (51g) or the second wiring group (52g) of the coil on a rear side of the one coil overlap. Therefore, although the wirings of the front and rear coils overlap in the central space (SC) (the flexible substrate is doubly overlapped), since the overlapping occurs in the opening (OP) of the flexible substrate provided in the central space (SC), the flexible substrate does not become triply overlapped. The thickness of the motor coil substrate 20 can be uniformized and the space factor of the coils can be increased.

Winding directions of adjacent coils (C) in the coil substrate 201 are opposite with respect to each. However, by folding the flexible substrate 22 between adjacent coils (C), the winding directions of the coils (C) in the laminated coil substrate 202 are the same. The winding directions of the coils (C) formed in the laminated coil substrate 202 are observed from a position (W). Directions of currents flowing through the coils (C) in the laminated coil substrate 202 are the same. Since the laminated coil substrate 202 is wound, the winding directions of the coils in the motor coil substrate 20 are the same. The directions of the currents flowing through the coils (C) in the motor coil substrate 20 are the same. The directions of the currents flowing through the coils (C) formed in the laminated coil substrate 202 is observed from the position (W).

As illustrated in FIG. 4C, by winding the laminated coil substrate 202, the motor coil substrate 20 is obtained. The laminated coil substrate 202 is wound around the hollow space (AH). An example of a shape of the motor coil substrate 20 is a cylindrical shape.

The motor coil substrate 20 is positioned around the magnet 48 such that the top surface (Tt) and the magnet 48 oppose each other (see FIG. 1A). Or, the motor coil substrate 20 is positioned around the magnet 48 such that the bottom surface (B) and the magnet 48 oppose each other. The magnet 48 is positioned inside the motor coil substrate 20. The motor 10 including the magnet 48 and the motor coil substrate 20 is completed. Since the folded flexible substrate 22 is positioned around the magnet 48, a positional relationship between the m-th coil (Cm) and the (m+1)-th coil (Cm1) can be maintained. The positional relationship between the m-th coil and the (m+1)-th coil can be maintained. A motor having high efficiency can be provided.

The motor coil substrate 20 of the second embodiment desirably satisfies the following relationship 2 with respect to the distance (DC) of each of the coils (C), the radius (R), and the number N of the coils.

$DC \times N \approx 2\pi \times K \times R$          Relation 2 wherein K is 2 or more and 4 or less. K is desirably 2.5. The number of windings of the laminated coil substrate 202 is more than 1 and less than 2. For example, the laminated coil substrate 202 is wound such that the first wiring group (51g) of the 1st coil (C1) is positioned on the central space (SC) of the N-th coil (Cn), and the central space (SC) of the 1st coil (C1) is positioned on the second wiring group (52g) of the N-th coil (Cn). Therefore, the two ends of the laminated coil substrate 202 can be bonded to each other. A cylindrical motor coil substrate 20 can be manufactured using the laminated coil substrate 202.

As illustrated in FIG. 4C, the shape of the motor coil substrate 20 is a cylindrical shape having the radius (R). A cross-sectional shape of the motor coil substrate 20 is substantially a circle. A radius of the circle is R (the radius (R)). The radius (R) is a distance between the center of the circle and a surface of the flexible substrate 22 facing the hollow space (AH). The surface of the flexible substrate 22 is the first surface (F) or the second surface (S). The surface of the flexible substrate 22 is the first surface (F) or the second surface (S) closest to the center.

Then, the distance (D), the radius (R), and the number N satisfy the following relation 1.

$D \approx 2\pi R/N$          Relation 1

Since the motor coil substrate 20 satisfies the relation 1, by winding the laminated coil substrate 202, the wirings perpendicular to the rotation direction (MR) of the motor are positioned on the central spaces (SC). The wirings perpendicular to the rotation direction (MR) of the motor are positioned on the wirings perpendicular to the rotation direction (MR) of the motor.

Third Embodiment

Figure 7A:
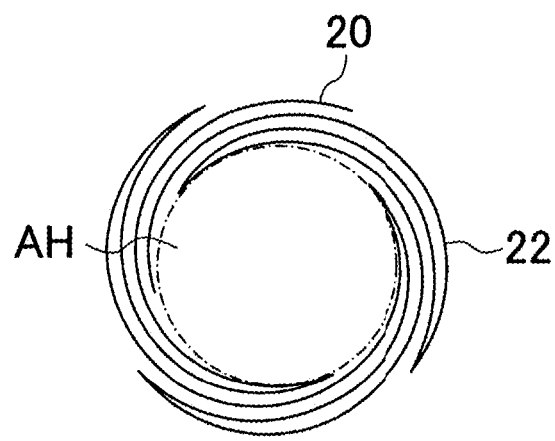
FIG. 7A illustrates a cross section of a motor coil substrate of a third embodiment.

FIG. 7A illustrates a cross section of a motor coil substrate 20 of a third embodiment.

Figure 6A:
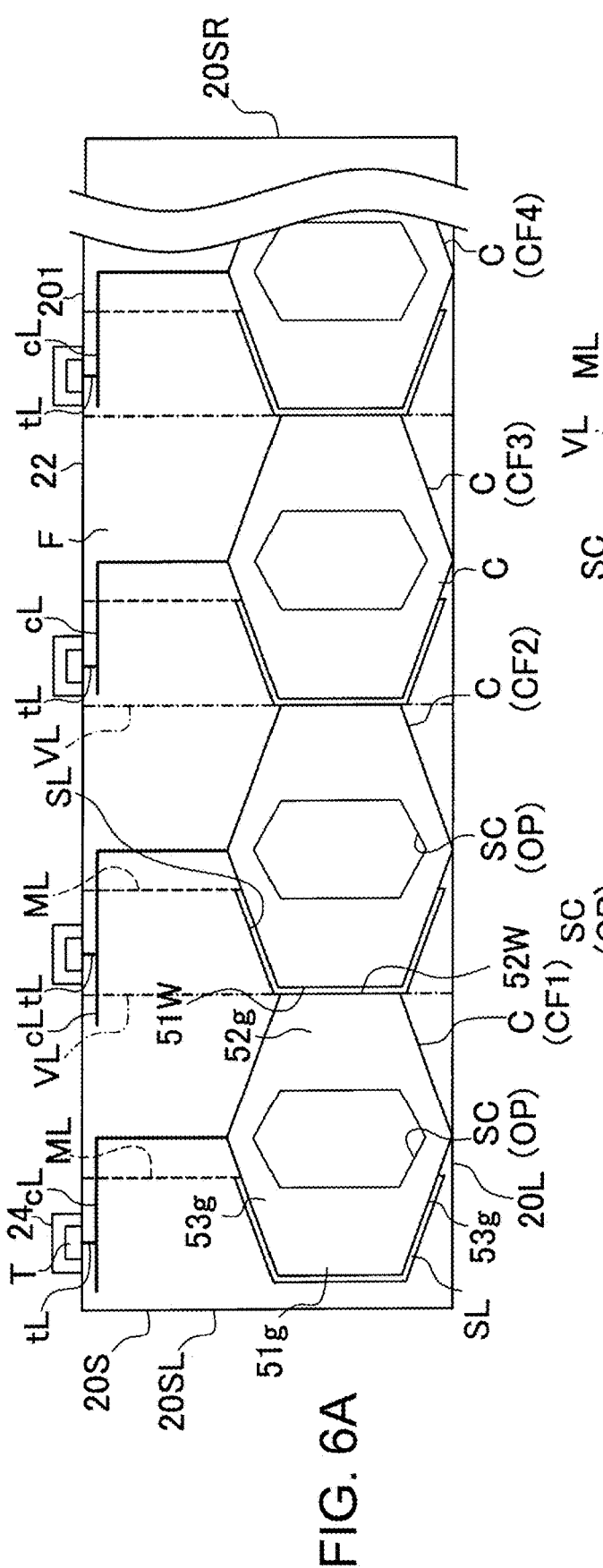
FIG. 6A illustrates coils, cuts and folding lines according to a third embodiment, the coils being formed by wiring groups.
Figure 6B:
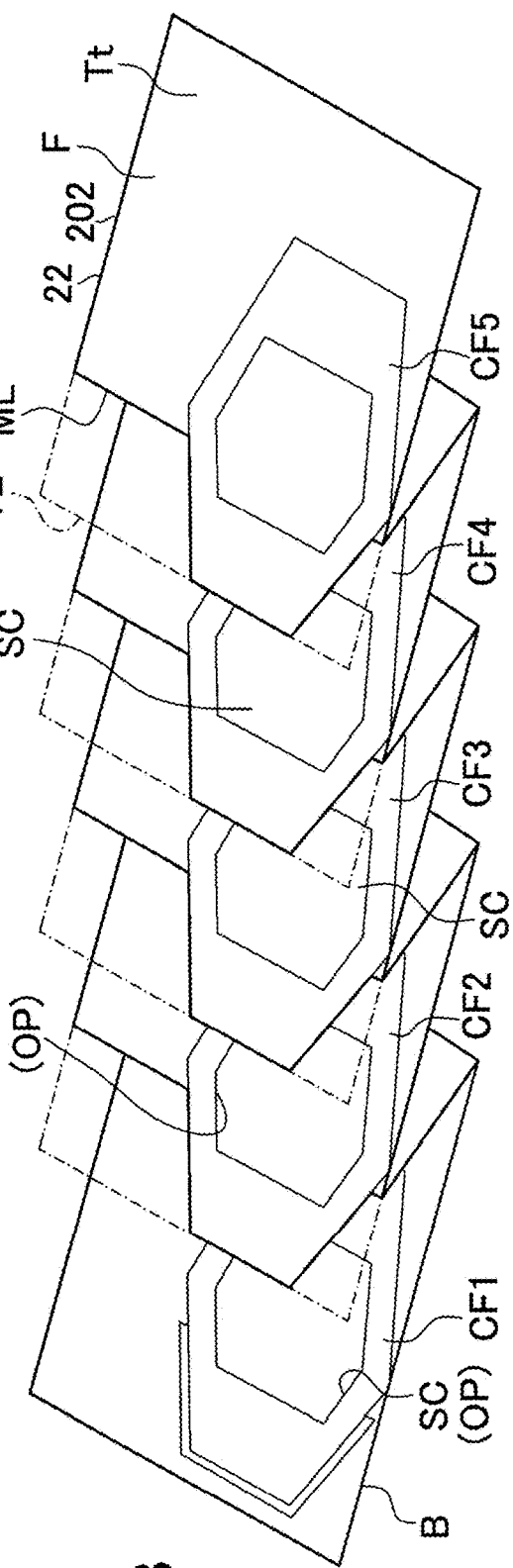
FIG. 6B illustrates an outline of a laminated coil substrate.

According to the third embodiment, a coil substrate 201 for forming the motor coil substrate 20 is prepared. An outline of the coil substrate 201 is illustrated in FIG. 6A. By folding the coil substrate 201, a laminated coil substrate 202 illustrated in FIG. 6B is formed. Then, by winding the laminated coil substrate 202, the motor coil substrate 20 is manufactured. The number of windings is 1 or more and 5 or less. By positioning a magnet inside the motor coil substrate 20, a motor 10 is manufactured.

As illustrated in FIG. 6A, the coil substrate 201 has a flexible substrate 22, which has a first surface (F) and a second surface (S) on an opposite side with respect to the first surface (F), and multiple coils (C), which are formed on the first surface (F) of the flexible substrate 22, and cuts (SL). A coil (C) formed on the first surface (F) is referred to as an upper coil (CF). In FIG. 6A, the coils (C) are simplified.

As illustrated in FIG. 6A, the coil substrate 201 of the third embodiment can have terminal substrates 24 and terminals (T) formed on the terminal substrates 24. The terminal substrates 24 and the flexible substrate 22 that supports the coils (C) are formed of a single-piece flexible substrate 22.

As illustrated in FIG. 6A, the coil substrate 201 can include connection wirings (cL) and multiple terminal wirings (tL), the terminal wirings (tL) connecting the connection wirings (cL) to the terminals (T). The terminal wirings (tL) include a terminal wiring (tL) extending from a connection wiring (cL) connecting between the m-th upper coil (CFm) and the (m+1)-th upper coil (CFm1), and a terminal wiring (tL) extending from a connection wiring (cL) connecting between the N-th upper coil (CFn) and the 1st upper coil (CF1). In FIG. 6A, the connection wirings (cL) are omitted.

As illustrated in FIG. 6A, the flexible substrate 22 preferably has short sides (20S) and long sides (20L). The upper coils (CF) are arrayed along the long sides (20L) of the flexible substrate 22. The upper coils (CF) are arrayed in one row from a one-end (20SL) to an other-end (20SR) of the flexible substrate 22. The number of the upper coils (CF) is N. N is a natural number. N is 3 or more and 11 or less.

The coils (C) are each formed by a central space (SC) and wiring groups surrounding the central space (SC). The wiring groups include a first wiring group (51g) and a second wiring group (52g), which are perpendicular to the rotation direction (MR) (see FIG. 1B), and a third wiring group (53g) connecting the first wiring group (51g) and the second wiring group (52g) to each other. An opening (OP) is formed along each of the central spaces (SC).

Winding directions of the upper coils (CF) in the coil substrate are the same. Directions of currents flowing through the upper coils (CF) in the coil substrate are the same. The winding directions and the directions of the currents are observed from a position above the first surface (F).

As illustrated in FIG. 6A, the cuts (SL) are respectively formed along the coils (C). The cuts (SL) are respectively formed outside the coils (C). The cuts (SL) are each formed along a part of a coil (C). The cuts do not respectively entirely surround the coils (C). Among the coils, the 1st coil (CF1) is closest to the one-end (20SL).

As illustrated in FIG. 6B, the coil substrate 201 is folded using the cuts (SL). The coil substrate 201 is folded along folding lines (VL, ML). The coil substrate 201 is folded such that the first surface (F) and the first surface (F) face each other. The laminated coil substrate 202 illustrated in FIG. 6B is obtained. The laminated coil substrate 202 is formed to include the folded flexible substrate 22 and the coils (C) formed on the flexible substrate 22. The folding lines (VL, ML) are substantially parallel to the first wirings (51g). The folding lines (ML) each extend from an end of a cut (SL). The folding lines (VL) are each connected to one side of a cut (SL) close to the one-end (20SL).

As illustrated in FIG. 6B, the laminated coil substrate 202 has a bottom surface (B) and a top surface (Tt) on an opposite side with respect to the bottom surface (B). The bottom surface (B) is a lowermost surface of the laminated coil substrate 202, and the top surface (Tt) is an uppermost surface of the laminated coil substrate 202. As illustrated in FIG. 6B, the flexible substrate 22 is folded such that a stairway is formed in one direction from the bottom surface (B) to the top surface (Tt).

Figure 7B:
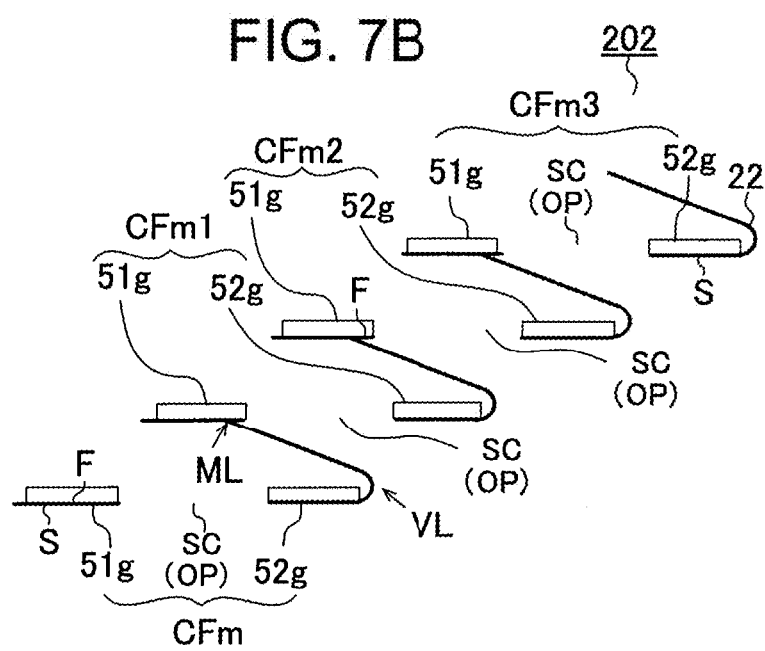
FIG. 7B illustrates a cross section of a laminated coil substrate of the third embodiment.

As illustrated in FIG. 7B, when the coil substrate 201 is folded, the first wiring group (51g) of the (m+1)-th upper coil (CFm1) is positioned on the central space (SC) (opening (OP)) of the m-th upper coil (CFm). Further, the central space (SC) (opening (OP)) of the (m+1)-th upper coil (CFm1) is positioned on the second wiring group (52g) of the m-th upper coil (CFm).

As illustrated in FIG. 7B, in the laminated coil substrate 202 of the third embodiment, the second wiring group (52g) of the m-th upper coil (CFm) and the first wiring group (51g) of the (m+2)-th upper coil (CFm2) overlap in the opening (OP) of the central space (SC) of the (m+1)-th upper coil (CFm1).

The second wiring group (52g) of the (m+1)-th upper coil (CFm1) and the first wiring group (51g) of the (m+3)-th upper coil (CFm3) overlap in the opening (OP) of the central space (SC) of the (m+2)-th upper coil (CFm2). In the third embodiment, in the central space (SC) of one upper coil (CF), the second wiring group (52g) of the coil on a front side of the one upper coil (CF) and the first wiring group (51g) of the coil on a rear side of the one upper coil (CF) overlap. Therefore, in the motor coil substrate 20 of the third embodiment, a locally thick portion does not occur.

In the motor coil substrate 20 of the third embodiment, in the central space (SC) of one upper coil (CF), the second wiring group (52g) of the coil on a front side of the one upper coil (CF) and the first wiring group (51g) of the coil on the rear side of the one upper coil (CF) overlap. Therefore, although the wirings of the front and rear coils overlap in the central space (SC) (the flexible substrate is doubly overlapped), since the overlapping occurs in the opening (OP) of the flexible substrate provided in the central space (SC), the flexible substrate does not become triply overlapped. The thickness of the motor coil substrate 20 can be uniformized and the space factor of the coils can be increased.

In the third embodiment, by folding the flexible substrate 22, the coils (C) formed on the flexible substrate 22 can be stacked on each other. Therefore, the coils (C) can be stacked on each other with high accuracy. A space factor of the coils can be efficiently increased. Conductor resistance of the coils is lowered. A motor having high efficiency can be provided.

The coil substrate 201 has the cuts (SL). Then, by folding the coil substrate 201 using the cuts (SL), the laminated coil substrate 202 of the third embodiment is formed. Therefore, a distance between adjacent coils (C) can be shortened. Since distances between the coils are short, the coils can be stacked on each other with high positional accuracy.

The winding directions of the coils (C) in the coil substrate 201 are the same. The winding directions of the coils (C) in the laminated coil substrate 202 are the same.

The directions of the currents flowing through the coils (C) in the coil substrate 201 are the same. The directions of the currents flowing through the coils (C) in the laminated coil substrate 202 are the same.

As illustrated in FIG. 7A, by winding the laminated coil substrate 202, the motor coil substrate 20 is obtained. The laminated coil substrate 202 is wound around the hollow space (AH). An example of a shape of the motor coil substrate 20 is a cylindrical shape.

Multiple coils can be added on the second surface (S) of the flexible substrate 22 of each of the second embodiment and the third embodiment. A coil (C) on the second surface (S) is referred to as a lower coil (CS). The upper coils (CF) respectively oppose the lower coils (CS) via the flexible substrate 22. When the lower coils (CS) are projected on the first surface (F) with light perpendicular to the first surface (F), the upper coils (CF) respectively substantially overlap with the lower coils (CS). Winding directions of an upper coil (CF) and a lower coil (CS) that oppose each other are the same. Directions of currents flowing through an upper coil (CF) and a lower coil (CS) that oppose each other are the same. The upper coils (CF) are connected to the lower coils (CS) by through-hole conductors penetrating the flexible substrate 22. The winding directions of the coils (C) and the directions of the currents flowing through the coils (C) are observed from a position above the first surface (F).

The electric motor of Japanese Patent Application Laid-Open Publication No. 2007-124892 includes multiple single coils formed of wires. The coils are formed of wires. When the wires are thin, it is thought that it is difficult to wind the wires. For example, it is thought that the wires may break. It is thought that it is difficult to wind the wires with high positional accuracy. In this case, it is believed that a space factor is decreased.

A motor coil substrate according to an embodiment of the present invention is formed by winding a coil substrate that includes a flexible substrate and multiple coils, the flexible substrate having a one-end and an other-end on an opposite side with respect to the one-end, and the coils being formed on the flexible substrate and being arrayed from the one-end toward the other-end. The coils are each formed of a central space and wirings surrounding the central space, and an opening of the flexible substrate is provided in the central space.

According to an embodiment of the present invention, coils are formed of wirings. For example, the coils can be formed using a technology for a printed wiring board. Therefore, the wirings forming the coils can be formed to each have a substantially rectangular cross-sectional shape. A space factor of the coils can be increased. In the central space of one coil, the wirings of the coil on a front side of the one coil and the wirings of the coil on a rear side of the one coil overlap. Therefore, although the wirings of the front and rear coils overlap in the central space (the flexible substrate is doubly overlapped), since the overlapping occurs in the opening of the flexible substrate provided in the central space, the flexible substrate does not become triply overlapped. The thickness of the motor coil substrate can be uniformized and the space factor of the coils can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A motor coil substrate, comprising:
a coil substrate configured to be wound in a cylindrical shape and comprising a flexible substrate and a plurality of coils formed on the flexible substrate such that the flexible substrate has a first end and a second end on an opposite side with respect to the first end and that the plurality of coils is positioned from the first end to the second end of the flexible substrate,
wherein the plurality of coils is formed such that each of the coils has a central space and comprises a plurality of wirings surrounding the central space, the flexible substrate has a plurality of openings formed such that each of the openings is penetrating through the flexible substrate and positioned in the central space of a respective one of the coils, the plurality of coils is formed such that each of the coils includes the plurality of wirings comprising a plurality of first wirings formed substantially in parallel to each other and a plurality of second wirings formed substantially in parallel to each other, and that the first wirings and the second wirings are formed substantially in parallel to each other and facing each other via the central space, and the plurality of coils is arrayed on the flexible substrate such that when the coil substrate is wound in the cylindrical shape, the plurality of first wirings forming a first wiring group and the plurality of second wirings forming a second wiring group are positioned in the central space of one of the coils.

2. The motor coil substrate according to claim 1, wherein the plurality of coils is formed such that the first wiring group has a width W1 extending along a rotation direction of a motor, that the second wiring group has a width W2 extending along the rotation direction of the motor, that the width W1 of the first wiring group is substantially equal to the width W2 of the second wiring group, that each of the openings in the central space of a respective one of the coils has a width W0 extending along the rotation direction of the motor, and that each of the width W1 and the width W2 is shorter than the width W0.

3. The motor coil substrate according to claim 2, wherein the plurality of coils is formed such that an angle between the plurality of first wirings and the rotation direction of the motor is substantially 90 degrees.

4. The motor coil substrate according to claim 2, wherein the coil substrate is configured to be folded such that the plurality of coils includes at least one lower coil, at least one inner coil and at least one upper coil and that when the coil substrate is folded, the second wiring group of the at least one lower coil and the first wiring group of the at least one upper coil overlap in the opening of the central space of inner coil.

5. The motor coil substrate according to claim 1, wherein the coil substrate is formed such that the plurality of coils is arrayed from the first end to the second end and has gaps formed between adjacent ones of the coils, and configured to be folded and form a laminated coil substrate when folded such that the laminated coil substrate is configured to be wound and form the cylindrical shape.

6. The motor coil substrate according to claim 5, wherein the laminated coil substrate is configured to be wound and form the cylindrical shape such that the cylindrical shape satisfies $D \approx 2\pi R/N$ where R is a radius, N is a number of the coils, D is a distance of each of the gaps.

7. The motor coil substrate according to claim 1, wherein the coil substrate has a plurality of cuts formed in the flexible substrate such that each of the cuts are formed along a part of each of the coils, and the coil substrate is configured to be folded and form a laminated coil substrate when folded such that the part of each of the coils is separated at a respective one of the cuts and that the laminated coil substrate is configured to be wound and form the cylindrical shape.

8. The motor coil substrate according to claim 7, wherein the coil substrate is configured to be folded such that the plurality of wirings of a (m+1)-th coil is positioned on the central space of a m-th coil in the laminated coil substrate, where m is a natural number.

9. A motor, comprising:
the motor coil substrate of claim 1; and
a magnet positioned inside the cylindrical shape formed by winding the coil substrate.

10. The motor coil substrate according to claim 3, wherein the coil substrate is configured to be folded such that the plurality of coils includes at least one lower coil, at least one inner coil and at least one upper coil and that when the coil substrate is folded, the second wiring group of the at least one lower coil and the first wiring group of the at least one upper coil overlap in the opening of the central space of inner coil.

11. The motor coil substrate according to claim 2, wherein the coil substrate is formed such that the plurality of coils is arrayed from the first end to the second end and has gaps formed between adjacent ones of the coils, and configured to be folded and form a laminated coil substrate when folded such that the laminated coil substrate is configured to be wound and form the cylindrical shape.

12. The motor coil substrate according to claim 11, wherein the laminated coil substrate is configured to be wound and form the cylindrical shape such that the cylindrical shape satisfies $D \approx 2\pi R/N$ where R is a radius, N is a number of the coils, D is a distance of each of the gaps.

13. The motor coil substrate according to claim 2, wherein the coil substrate has a plurality of cuts formed in the flexible substrate such that each of the cuts are formed along a part of each of the coils, and the coil substrate is configured to be folded and form a laminated coil substrate when folded such that the part of each of the coils is separated at a respective one of the cuts and that the laminated coil substrate is configured to be wound and form the cylindrical shape.

14. The motor coil substrate according to claim 13, wherein the coil substrate is configured to be folded such that the plurality of wirings of a (m+1)-th coil is positioned on the central space of a m-th coil in the laminated coil substrate, where m is a natural number.

15. A motor, comprising:
the motor coil substrate of claim 2; and
a magnet positioned inside the cylindrical shape formed by winding the coil substrate.

16. The motor coil substrate according to claim 3, wherein the coil substrate is formed such that the plurality of coils is arrayed from the first end to the second end and has gaps formed between adjacent ones of the coils, and configured to be folded and form a laminated coil substrate when folded such that the laminated coil substrate is configured to be wound and form the cylindrical shape.

17. The motor coil substrate according to claim 16, wherein the laminated coil substrate is configured to be wound and form the cylindrical shape such that the cylindrical shape satisfies $D \approx 2\pi R/N$ where R is a radius, N is a number of the coils, D is a distance of each of the gaps.

18. The motor coil substrate according to claim 3, wherein the coil substrate has a plurality of cuts formed in the flexible substrate such that each of the cuts are formed along a part of each of the coils, and the coil substrate is configured to be folded and form a laminated coil substrate when folded such that the part of each of the coils is separated at a respective one of the cuts and that the laminated coil substrate is configured to be wound and form the cylindrical shape.

19. The motor coil substrate according to claim 18, wherein the coil substrate is configured to be folded such that the plurality of wirings of a (m+1)-th coil is positioned on the central space of a m-th coil in the laminated coil substrate, where m is a natural number.

20. A motor, comprising:
the motor coil substrate of claim 3; and
a magnet positioned inside the cylindrical shape formed by winding the coil substrate.

* * * * *